United States Patent
Tozzi et al.

(10) Patent No.: US 11,148,200 B2
(45) Date of Patent: Oct. 19, 2021

(54) METHOD FOR MANUFACTURING A COMPONENT OF A ROTATING MACHINE

(71) Applicant: Nuovo Pignone Tecnologie Srl, Florence (IT)

(72) Inventors: Pierluigi Tozzi, Florence (IT); Massimo Giannozzi, Florence (IT); Iacopo Giovannetti, Florence (IT); Leonardo Tognarelli, Florence (IT); Antonella Dimatteo, Florence (IT)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 0 days.

(21) Appl. No.: 15/780,711

(22) PCT Filed: Dec. 1, 2016

(86) PCT No.: PCT/EP2016/079420
§ 371 (c)(1),
(2) Date: Jun. 1, 2018

(87) PCT Pub. No.: WO2017/093394
PCT Pub. Date: Jun. 8, 2017

(65) Prior Publication Data
US 2018/0361479 A1 Dec. 20, 2018

(30) Foreign Application Priority Data
Dec. 2, 2015 (IT) .................. 102015000079354

(51) Int. Cl.
*B33Y 80/00* (2015.01)
*B33Y 10/00* (2015.01)
(Continued)

(52) U.S. Cl.
CPC .................. *B22F 5/04* (2013.01); *B22F 3/15* (2013.01); *B22F 7/06* (2013.01); *B22F 7/08* (2013.01);
(Continued)

(58) Field of Classification Search
None
See application file for complete search history.

(56) References Cited

U.S. PATENT DOCUMENTS 2,581,252 A    1/1952  Goetzel et al.
3,019,516 A *  2/1962  Holzwarth ................ C23C 4/02
                                                428/556
(Continued)

FOREIGN PATENT DOCUMENTS

CN    101791886 A    11/2012

OTHER PUBLICATIONS

Nickel-Chromium Alloys (NiCr), READE International Corp., https://www.reade.com/products/nickel-chromium-alloys-nicr, captured May 18, 2020 (4 pages). (Year: 2020).*

(Continued)

*Primary Examiner* — Adam Krupicka
(74) *Attorney, Agent, or Firm* — Baker Hughes Patent Organization

(57) ABSTRACT

A method for manufacturing a component of a rotating machine comprises the steps of forming a structural inner portion by additive manufacturing from a first material; covering the structural inner portion with a protective outer portion made of a second material; the first material has a melting point higher than a second material.

14 Claims, 3 Drawing Sheets

(51) Int. Cl.
  B22F 5/04 (2006.01)
  F01D 5/28 (2006.01)
  F04D 29/18 (2006.01)
  F04D 29/02 (2006.01)
  B22F 7/06 (2006.01)
  F01D 5/14 (2006.01)
  B22F 10/20 (2021.01)
  B22F 3/15 (2006.01)
  B22F 7/08 (2006.01)

(52) U.S. Cl.
  CPC .............. *B22F 10/20* (2021.01); *B33Y 10/00* (2014.12); *B33Y 80/00* (2014.12); *F01D 5/147* (2013.01); *F01D 5/28* (2013.01); *F01D 5/286* (2013.01); *F01D 5/288* (2013.01); *F04D 29/02* (2013.01); *F04D 29/18* (2013.01); *B22F 2301/20* (2013.01); *B22F 2998/10* (2013.01); *F05D 2220/32* (2013.01); *F05D 2230/21* (2013.01); *F05D 2230/211* (2013.01); *F05D 2230/30* (2013.01); *F05D 2230/42* (2013.01); *F05D 2240/30* (2013.01); *F05D 2300/13* (2013.01); *F05D 2300/173* (2013.01); *Y02P 10/25* (2015.11)

(56) References Cited

U.S. PATENT DOCUMENTS

| | | | | |
|---|---|---|---|---|
| 4,407,971 A | * | 10/1983 | Komatsu | C04B 35/593 501/96.3 |
| 5,595,616 A | * | 1/1997 | Berczik | C22C 32/0047 148/538 |
| 5,865,909 A | * | 2/1999 | Meyer | C22C 27/04 148/423 |
| 6,395,406 B1 | * | 5/2002 | Sangeeta | B22F 1/0003 148/527 |
| 2009/0136381 A1 | * | 5/2009 | Tin | C22C 19/05 420/445 |
| 2011/0247590 A1 | * | 10/2011 | Donovan | F23R 3/283 123/470 |
| 2011/0311389 A1 | | 12/2011 | Ryan et al. | |
| 2012/0163985 A1 | | 6/2012 | Darkins, Jr. et al. | |

OTHER PUBLICATIONS

Strangman, T.E., et al., "Development of Exothermically Cast Single-Crystal Mar-M 247 and Derivative Alloys," Superalloys, pp. 215-224 (Sep. 21-25, 1980).

Search Report and Opinion issued in connection with corresponding IT Application No. 102015000079354 dated Aug. 15, 2016 (English Translation not available).

International Search Report and Written Opinion issued in connection with corresponding PCT Application No. PCT/EP2016/079420 dated Mar. 8, 2017.

International Preliminary Report on Patentability issued in connection with corresponding PCT Application No. PCT/EP2016/079420 dated Jun. 5, 2018.

* cited by examiner

METHOD FOR MANUFACTURING A COMPONENT OF A ROTATING MACHINE

The present disclosure relates to a method for manufacturing a component of a rotating machine. In particular, the present disclosure is relevant for the manufacturing of gas turbine blades. Therefore such specific application will be referenced multiple times in the disclosure, however no loss of generality is intended.

A key limiting factor in early turbomachine was the performance of the materials available for the hot section (combustor and turbine). The need for better materials spurred much research in the field of alloys and manufacturing techniques, and that research resulted in a long list of new materials and methods that make modern gas turbines possible. One of the earliest of these was Nimonic, used in the British Whittle engines.

The development of superalloys in the 1940s and new processing methods such as vacuum induction melting in the 1950s greatly increased the temperature capability of turbine blades. Further processing methods like hot isostatic pressing improved the alloys used for turbine blades and increased turbine blade performance. Modern turbine blades often use nickel-based superalloys that incorporate chromium, cobalt, and rhenium.

Aside from alloy improvements, a major breakthrough was the development of directional solidification (DS) and single crystal (SC) production methods. These methods help greatly increase strength against fatigue and creep by aligning grain boundaries in one direction (DS) or by eliminating grain boundaries all together (SC).

Another major improvement to turbine blade material technology was the development of thermal barrier coatings (TBC). Where DS and SC developments improved creep and fatigue resistance, TBCs improved corrosion and oxidation resistance, both of which become greater concerns as temperatures increased. The first TBCs, applied in the 1970s, were aluminide coatings. Improved ceramic coatings became available in the 1980s. These coatings increased turbine blade temperature capability by about 200° F. (90° C.). The coatings also improve blade life, almost doubling the life of turbine blades in some cases.

Most turbine blades are manufactured by investment casting (or lost-wax processing). This process involves making a precise negative die of the blade shape that is filled with wax to form the blade shape. If the blade is hollow (i.e., it has internal cooling passages), a ceramic core in the shape of the passage is inserted into the middle. The wax blade is coated with a heat-resistant material to make a shell, and then that shell is filled with the blade alloy. This step can be more complicated for DS or SC materials, but the process is similar. If there is a ceramic core in the middle of the blade, it is dissolved in a solution that leaves the blade hollow. The blades are coated with the TBC they will have, and then cooling holes are machined as needed, creating a complete turbine blade.

The above described turbine blade and processes have their limits in term of operational temperatures and, as it is known in the technical field, higher temperatures at the turbine increase the efficiency of the machine. Therefore, as mentioned above, known solution of the state of the art employ various types of cooling on the blades. Disadvantageously, cooling itself reduces the efficiency of the machine and increases the structural complexity of the stages of the turbine.

SUMMARY

A first embodiment of the invention therefore relates to a method for manufacturing a component of a rotating machine. The method comprises the steps of forming a structural inner portion by additive manufacturing from a first material. Then the structural inner portion is covered with a protective outer portion made of a second material.

A second embodiment of the invention relates to a component for a rotating machine. Such component comprises a structural inner portion manufactured by additive manufacturing and made from a first material. Also, the component comprises a protective outer portion covering the structural inner portion and made of a second material.

In both embodiments, the first material has a melting point higher than the second material.

The thermostructural resistance of the component 1 is increased, because of the load bearing capacity of the inner portion, which is in turn protected from corrosion by the outer portion. This allows to increase the efficiency of the gas turbine or, alternatively, allows to reduce or eliminate the need for cooling systems at current temperatures. The life of the component is extended.

The costs for producing the component are also sensibly reduced.

BRIEF DESCRIPTION OF THE DRAWINGS

Further details and specific embodiments will refer to the attached drawings, in which.

DETAILED DESCRIPTION

Figure 1:
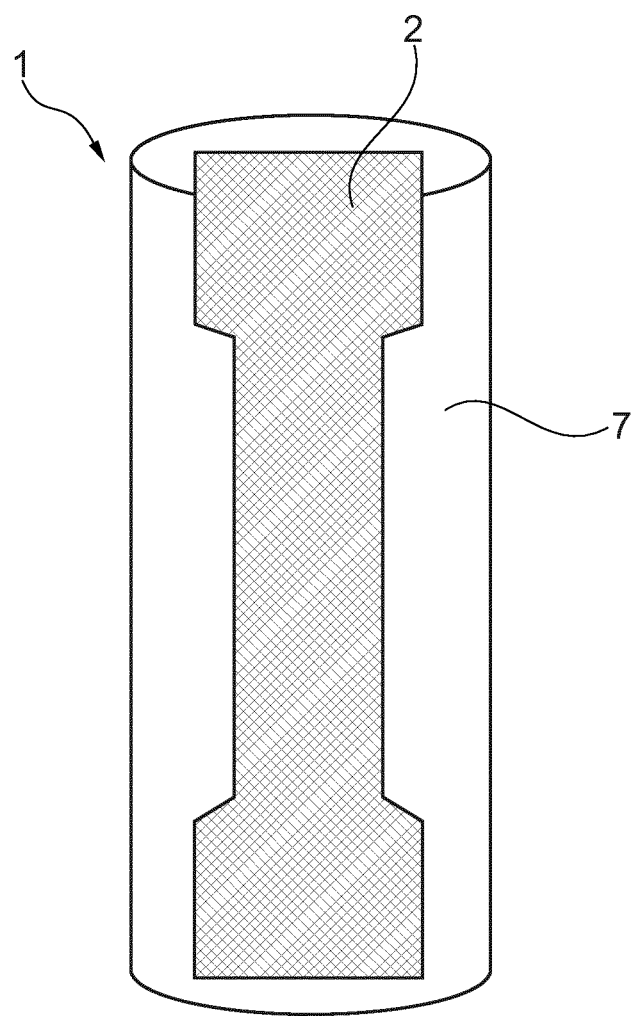
FIG. 1 is a schematic view of a component for a rotating machine according to a first embodiment of the present invention.

The following description of exemplary embodiments refer to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

With reference to the attached figures, with 1 is indicated a component for a rotating machine. As explained above, the component 1 can be a gas turbine blade.

The component 1 is designed to operate at high temperature, therefore it is expected to withstand both structural loads and corrosion at these temperatures. Temperatures higher than 1000° C. are considered high temperatures according to the meaning of the present disclosure.

In an application of the component 1, which is a blade of a rotating machine, the main sources of structural loads are the inertial forces of the rotating assembly and the fluidodynamic forces generated by the operating fluid. The main corrosion agent is oxygen. These characteristics of the environment, being intended to explain the embodiment of the invention, should therefore not be construed as limiting the scope of the application.

The component 1 comprises a structural inner portion 2, which is the main provider of the total load-bearing capacity. Therefore, the inner portion 2 is made of a first material having appropriate mechanical properties.

The main properties required from the inner portion 2 are tensile strength and creep resistance. By tensile strength, is meant the maximum stress that a material can withstand while being stretched or pulled before failing or breaking. By creep resistance it is meant the reduction of creep under load. In materials science, creep (sometimes called cold flow) is the tendency of a solid material to move slowly or deform permanently under the influence of mechanical stresses. It can occur as a result of long-term exposure to high levels of stress that are still below the yield strength of the material. Creep is more severe in materials that are subjected to heat for long periods, and generally increases as they near their melting point.

The required properties can be obtained by employing a first material chosen accordingly. Indeed, the first material comprises a predominant weight of a refractory metal or eutectic metal. Such refractory metal comprises tungsten or a tungsten alloy or a molybdenum alloy or silicides.

Such eutectic metal comprises nickel alloy or cobalt alloy. An example of first material can be a silicide-based composite material comprising a. a silicide of Mo, B, W, Nb, Ta, Ti, Cr, Co, Y, or a combination thereof,
b. $Si_3N_4$, and
c. at least an oxide selected from the group consisting of Yttrium oxides, Cerium oxides, and combinations thereof.

For the example application, the minimum values of ultimate tensile strength is 450 MPa at 1100° C. and 300 MPa at 1300° C.

Figure 2:
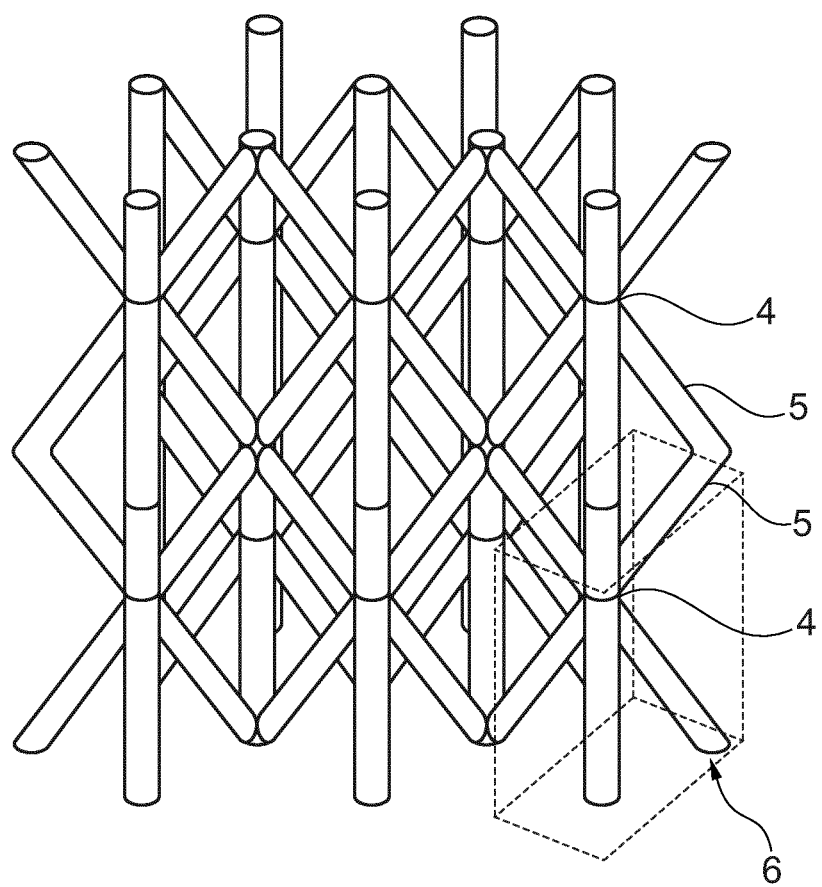
FIG. 2 is a detail view of a component for a rotating machine according to a second embodiment of the present invention.
Figure 3:
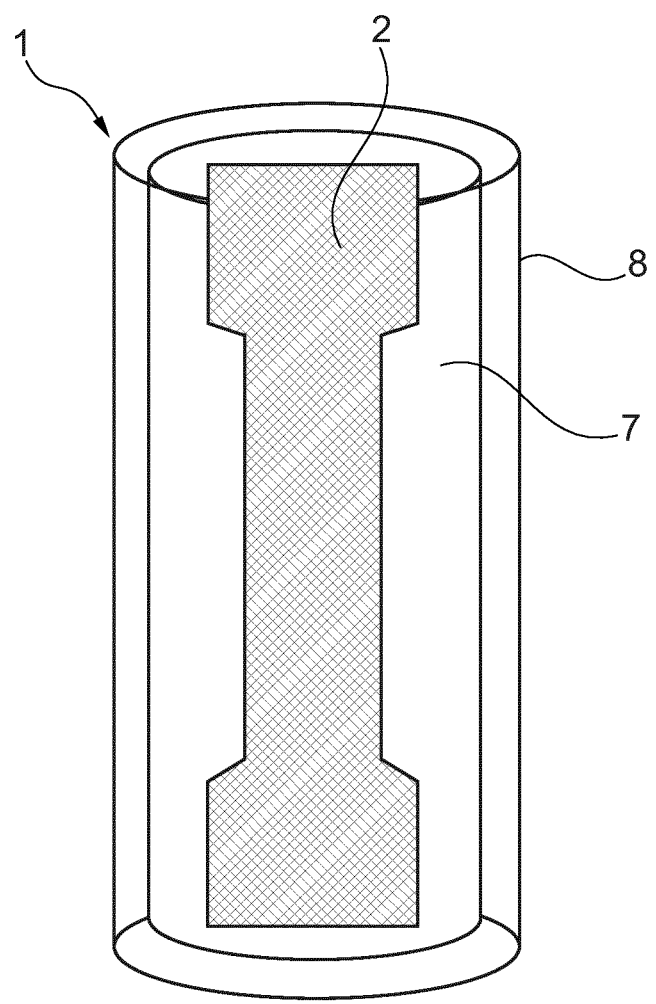
FIG. 3 is a schematic view of a component for a rotating machine according to a third embodiment of the present invention.

Structurally, the inner portion 2 can have either a lattice, a branched structure or any other kind of complex shape. A lattice structure, shown as an example in FIG. 2, is defined by a plurality of nodes 4 arranged either on a layer-by-layer basis or on a predefined three dimensional repeating structure. Adjacent nodes 4 are joined by beams 5. These beams 5 tend to resist mainly to an axial load, while bending and transverse load resistance is ensured by the geometry of the beams 5. A predefined, repeating set of nodes 4 and beams 5 defines a cell 6 of the lattice structure. For an example application, such cell 6 can be hexagonal.

A branched structure is a structure which is similar to a lattice structure but lacks a cell 6, therefore the beams 5 are arranged to optimize the load bearing capacity of the component 1 for expected loads.

A complex shape is a shape which is not easily defined as a superposition of regular or semiregular geometric shapes.

As it is shown in FIG. 1, the component 1 comprises a protective outer portion 7, which covers at least in part the inner portion 2. This outer portion 7 is made of a second material.

According to the embodiments of the invention, the first material has a melting point higher than the second material. In other words, while the first material is chosen for its structural characteristics, the choice of the second material is made with different guiding parameters, particularly corrosion resistance. Indeed, the second material is chosen so that it has a higher resistance to corrosion and oxidation than the first material at high temperatures. In other words, it can happen that the first material quickly corrodes and oxidizes at high temperatures, in particular the first material corrodes and oxidizes faster than the second material at high temperatures. Therefore, thanks to the layering of the outer portion 7 over the inner portion 2, the second material protects the first material from corrosion. For example, the second material can comprise a nickel aluminum alloy, such as Ni3Al, R108, CM247, NiAl, NiAlSi, NiCoCrAlY.

More in detail, at least two mechanical properties of the inner portion 2 are higher than that of the outer portion 7. As explained above, such mechanical properties are tensile strength and creep resistance.

In a particularly advantageous embodiment, the inner portion 2 is also shaped so to form a vessel 8 for receiving a powder of the second material. The vessel is configured to resist to pressures reached during the hot isostatic pressuring.

The thickness of the protective outer portion is not less than 1 mm, preferably not less than 2 mm. Such protective outer portion is not a coating, despite a thick layer having different mechanical properties. A method for manufacturing the component 1 is also an embodiment of the present invention. This method comprises the steps of forming the structural inner portion 2 by additive manufacturing from the first material. The additive manufacturing process can be direct metal laser melting (DMLM), direct metal laser sintering (DMLS), selective laser melting (SLM), electron beam melting (EBM), binder jet, injection molding or any other suitable process.

The structural inner portion 2 is then covered with a protective outer portion 7. This outer portion 7 is made of the above specified second material. With more detail, the step of covering the inner portion 2 comprises the sub step of hot isostatic pressing the second material on the inner portion 2. In alternative, the step of covering the inner portion 2 can comprise the sub step of investment casting the second material on the inner portion 2.

It is to be noted that the step of covering the inner portion 2 is performed at least partially in an atmosphere substantially without oxygen. Preferably, the working atmosphere is composed of Argon.

In one embodiment, the protective outer portion can adhere directly to the structural inner portion.

The protective outer layer can have an internal surface that is complementary to the external surface of the structural inner structure.

In particular, the protective outer layer and the structural inner layer can be shaped so to mechanically cooperate each other. For example, the structural inner layer can comprise superficial cavities shaped in such a way that, when the protective outer layer covers the structural inner portion, a mechanical connection is realized by the parts of protective outer layer entered in said cavities.

In a further embodiment, the protective outer portion covers the structural inner portion but doesn't adhere on it. In this case, an intermediate layer (not shown) of material can be provided. For example, the intermediate layer can be deposited on the structural inner portion by investment casting and subsequently covered by the protective outer portion by hot isostatic pressing. The material of the intermediate layer can be the same of the protective outer layer or different.

What we claim is:
1. A component for a rotating machine comprising:
a structural inner portion manufactured by additive manufacturing and made from a first material, the inner portion defined by a lattice structure comprising a plurality of cells, each cell formed by a repeating set of nodes and beams, where adjacent nodes are joined by beams;

a protective outer portion covering the structural inner portion and made of a second material, wherein the first material has a melting point higher than the second material and the component is a blade of a gas turbine.

2. The component according to claim 1, wherein at least two mechanical properties of the inner portion are higher than that of the outer portion.

3. The component according to claim 1, wherein the mechanical properties are tensile strength and creep resistance.

4. The component according to claim 1, wherein said second material has a higher resistance to corrosion and oxidation than the first material at high temperatures.

5. The component according to claim 4, wherein said high temperatures are higher than 1000° C.

6. The component according to claim 5, wherein the outer portion is made by hot isostatic pressuring.

7. The component according to claim 1, wherein the second material comprises a nickel aluminum alloy.

8. The component according to claim 1, wherein the first material comprises a predominant weight of a refractory metal.

9. The component according to claim 8, wherein the refractory metal comprises tungsten or a tungsten alloy or a molybdenum alloy.

10. The component according to claim 6, wherein the structural inner portion is a vessel configured to receive a powder of the second material and withstand pressures reached during the hot isostatic pressuring.

11. The component according to claim 1 wherein the outer portion covers entirely the inner portion.

12. The component according to claim 1, wherein the first material comprises a predominant weight of a eutectic metal.

13. The component according to claim 1, wherein the first material is a silicide-based composite material and the second material comprises a nickel aluminum alloy.

14. The component according to claim 13, wherein the silicide-based composite material comprises a silicide, $Si_3N_4$ and at least an oxide.

* * * * *